US008116382B2

(12) United States Patent
Heywood

(10) Patent No.: US 8,116,382 B2

(45) Date of Patent: Feb. 14, 2012

(54) SYSTEM AND METHOD OF DATA WORD FLIPPING TO PREVENT PATHOLOGICAL CONDITIONS ON HIGH-SPEED SERIAL VIDEO DATA INTERFACES

(75) Inventor: Gareth M. Heywood, Waterdown (CA)

(73) Assignee: Gennum Corporation (CA)

( * ) Notice: Subject to any disclaimer, the term of this patent is extended or adjusted under 35 U.S.C. 154(b) by 807 days.

(21) Appl. No.: 12/240,219

(22) Filed: Sep. 29, 2008

(65) Prior Publication Data

US 2009/0086794 A1 Apr. 2, 2009

Related U.S. Application Data

(60) Provisional application No. 60/976,662, filed on Oct. 1, 2007.

(51) Int. Cl.

| | |
|---|---|
| ***H04N 7/12*** | (2006.01) |
| ***H04L 9/00*** | (2006.01) |
| ***G06F 11/30*** | (2006.01) |

(52) U.S. Cl. ...................... 375/240.26; 380/28; 713/189

(58) Field of Classification Search .............. 375/240.26
See application file for complete search history.

(56) References Cited

U.S. PATENT DOCUMENTS

2005/0068959 A1 * 3/2005 Taunton et al. ............ 370/395.1
2007/0050805 A1 * 3/2007 Rotenstein ...................... 725/19

OTHER PUBLICATIONS

Canadian Intellectual Property Office, PCT International Search Report, dated Jan. 16, 2009, 3 pages.

* cited by examiner

*Primary Examiner* — Longbit Chai
(74) *Attorney, Agent, or Firm* — Jones Day

(57) ABSTRACT

Systems and methods are provided for reducing pathological conditions in a serial video interface. A sequence of parallel data words that are to be transformed by a data-scrambling algorithm comprise an input signal. The bit order of one or more of the words in the sequence of parallel data words is reversed and the sequence of parallel data words, now including one or more bit-reversed words, is transmitted. The signal resulting from application of a data-scrambling algorithm to the sequence of parallel data words, including one or more bit-reversed words, has a reduced likelihood of including a pathological condition.

16 Claims, 8 Drawing Sheets

SYSTEM AND METHOD OF DATA WORD FLIPPING TO PREVENT PATHOLOGICAL CONDITIONS ON HIGH-SPEED SERIAL VIDEO DATA INTERFACES

CROSS-REFERENCE TO RELATED APPLICATION

This application claims the benefit of U.S. Provisional Patent Application No. 60/976,662, filed Oct. 1, 2007, the entire disclosure of which is hereby incorporated by reference.

TECHNICAL FIELD

The technology described in this patent application relates generally to high-speed serial video data interfaces, and more specifically to a system and method of data word flipping to prevent pathological conditions on high-speed serial video data interfaces.

BACKGROUND

Serial video interfaces described by various SMPTE standards, such as SMPTE 259M, 292M and 424M employ data scrambling using a fixed polynomial. Certain combinations of data input to the scrambling polynomial are known to produce pathological conditions on the serial link. The pathological condition is characterized by long runs of low-frequency patterns.

The low-frequency patterns can cause non-optimum performance in receive devices which employ cable equalization and clock and data recovery, resulting in data errors or failure to recover the original data. The pathological condition can result in increased jitter which produces errors caused by poor clock recovery. The condition can also result in "false locking" since phase-locked loops (PLLs) may lock to the lower-frequency signal produced. Low-frequency data patterns also create DC offsets, requiring the signal to be "DC-restored" at the receive-end. The DC restoration process may add unwanted jitter, reducing timing margin.

The input to the data scrambler is usually in the form of 10-bit parallel data words. Certain combinations of these data words are known to cause the pathological condition. SMPTE RP 198 defines video checkfields which will produce long sequences of the pathological condition, thus providing a stressful "test pattern" for serial digital video systems. The 10-bit data word combinations are converted to serial, least significant bit first, and clocked into the scrambling polynomial.

Within the broadcast and video industry, many concerns have been voiced about the propagation of the "pathological problem" for new serial video interfaces, specifically high-bandwidth interfaces over optical fibre. Standard optical equipment used in the data communications industry is not designed to handle the stressful conditions produced by pathological signals. While companies such as Gennum Corporation have designed components specifically to handle pathological conditions, it is necessary to propose solutions for preventing pathological conditions, in order to get wider adoption of higher data rate interfaces.

SUMMARY

In accordance with the teachings herein, a system and method are provided to reduce pathological conditions in a serial video interface. An input includes a sequence of parallel data words that are to be transformed by a data-scrambling algorithm. One or more of the data words in the sequence have their bit order reversed, such as being ordered with the most significant bit (MSB) of the word first rather than the least significant bit (LSB) being first. The sequence of parallel data words, including the data words whose bit order was reversed, is transformed by the data-scrambling algorithm. The data-scrambling algorithm produces an output signal with a reduced likelihood of containing a pathological condition.

DETAILED DESCRIPTION

Figure 1:
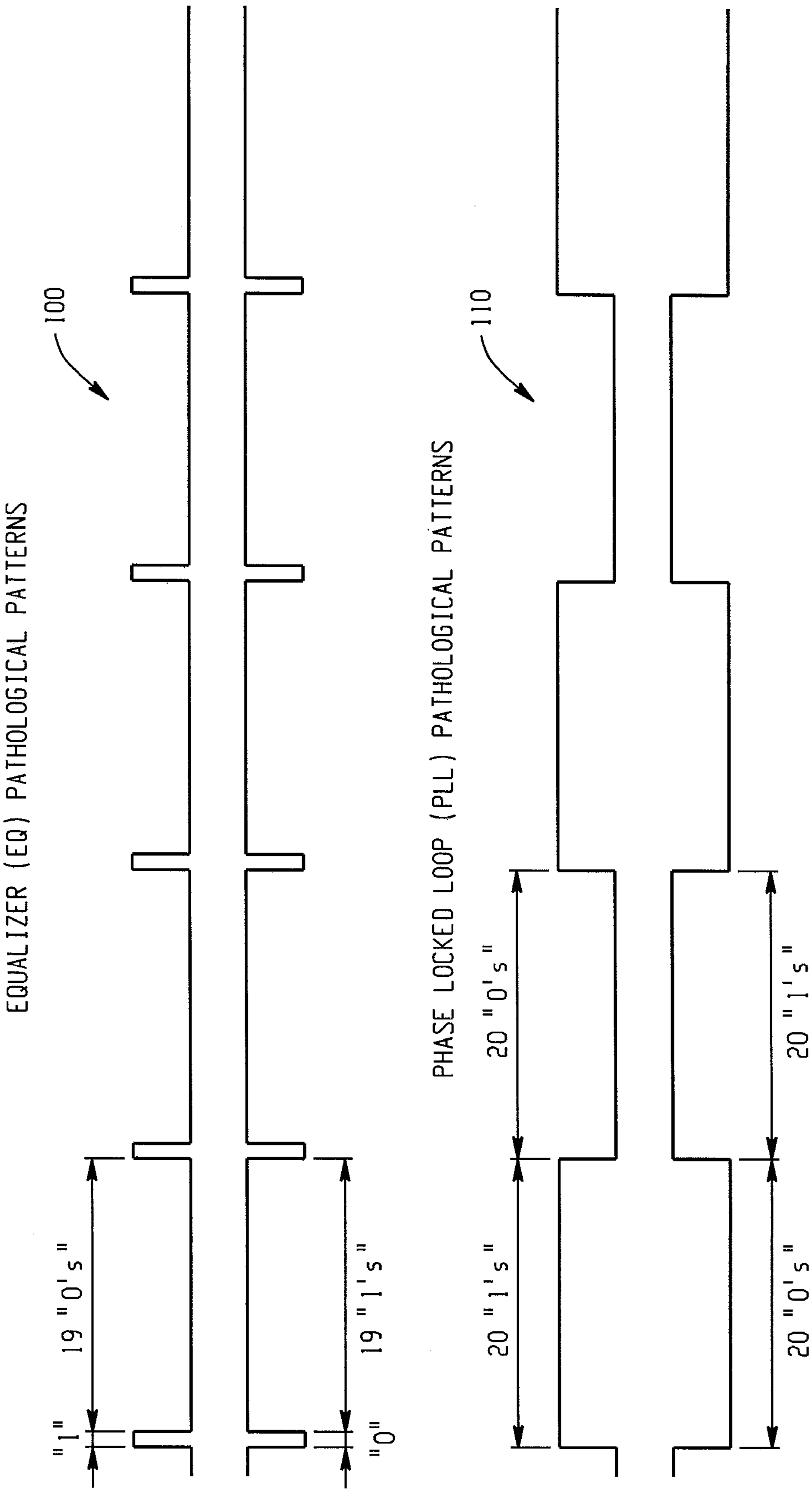
FIG. 1 is a signal diagram depicting a pathological condition in a high-speed serial video data stream.

FIG. 1 depicts a long-run low-frequency pattern 100 in an equalizer (EQ) signal in a high-speed serial video data stream. Similarly, a long-run low-frequency pattern in a phase locked loop (PLL) signal is depicted at 110. Low-frequency patterns such as those depicted at 100 and 110 can cause non-optimum performance in receive devices which employ cable equalization and clock and data recovery, resulting in data errors or failure to recover the original data. The pathological condition can result in increased jitter which produces errors caused by poor clock recovery. The condition can also result in "false locking" since phase-locked loops may lock to the lower-frequency signal produced. Low-frequency data patterns also create DC offsets, requiring the signal to be "DC-restored" at the receive-end. The DC restoration process may add unwanted jitter, reducing timing margin.

Low-frequency patterns such as 100 and 110 may be produced as the output of scrambling algorithms that are employed as part of serial video interfaces described in various SMPTE standards, such as SMPTE 259M, 292M and 424M. These standards employ fixed polynomials for data scrambling, and certain combinations of data input to the scrambling polynomials are known to produce pathological conditions on the serial link, which are characterized by low-frequency patterns as depicted at 100 and 110.

In serial video systems conforming to SMPTE 259M, 292M and 424M, the video data is scrambled according to the following polynomials:

$$(NRZ \text{ generator polynomial}): G1(X)=X^9+X^4+1; \qquad \text{Equation 1}$$

$$(NRZI \text{ generator polynomial}): G2(X)=X+1. \qquad \text{Equation 2}$$

Equations 1 and 2 form the scrambler. In typical operation of the scrambled, video data words, each 10 bits wide, are serially shifted into the scrambler, LSB first. This process then is reversed when the video signal is decoded elsewhere.

Figure 2:
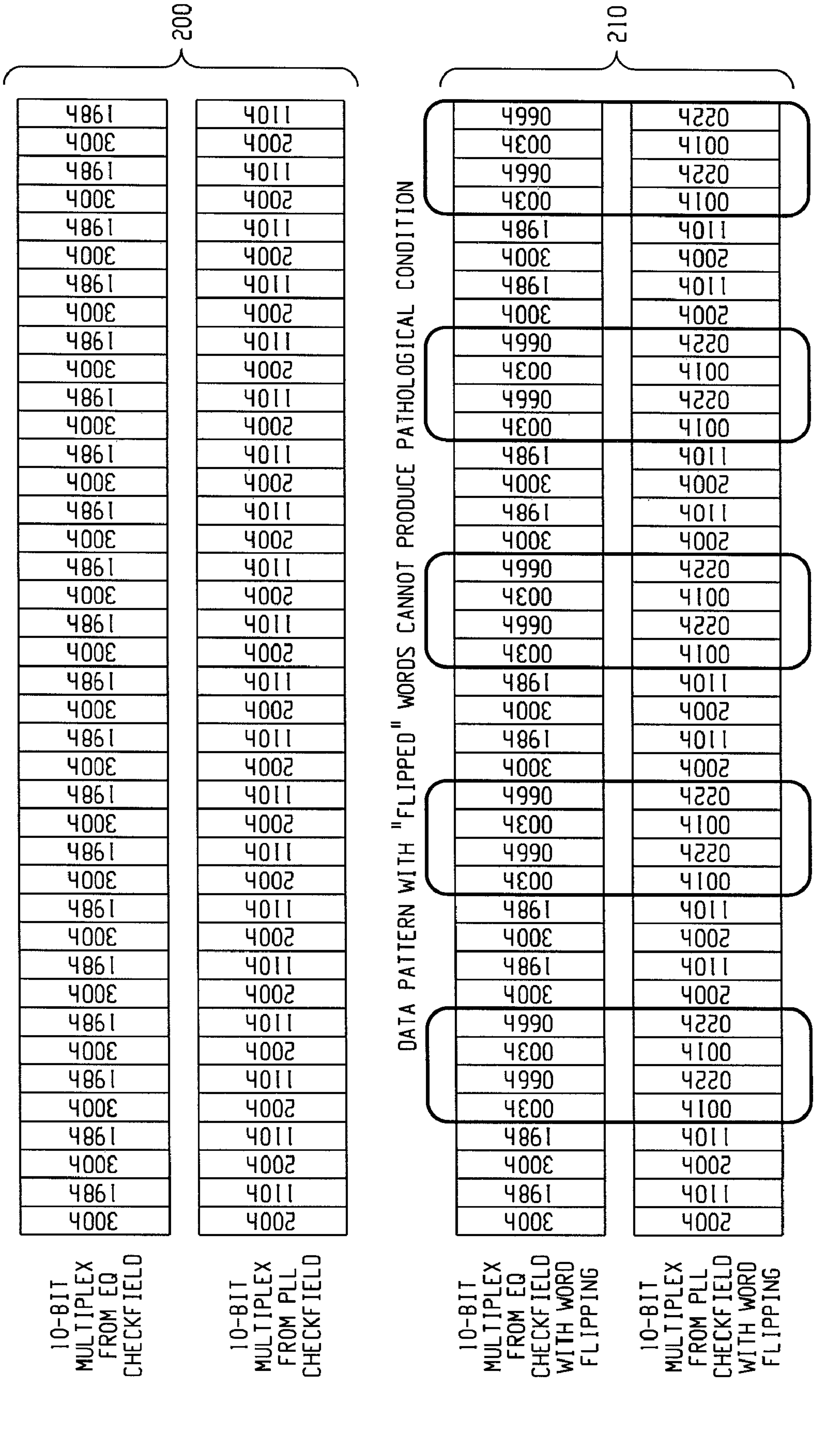
FIG. 2 is a block diagram depicting a high-speed serial video data stream in which data word flipping is employed to prevent a pathological condition.

FIG. 2 depicts at 200 known sequences, called checkfields, that produce pathological conditions, using the above scrambling polynomial. Examples of two such checkfields are set forth below, and are shown using 10-bit words, represented in hexadecimal notation:

Equalizer checkfield: 300h/198h/300h/198h/300h/198h/. . .

Phase-locked loop checkfield: 200h/110h/200h/110h/200h/110h/ . . .

In the above data sequences, an example of word-flipping is depicted in FIG. 2 at 210, which shows that four data words are flipped every four input data words. Note that the data streams depicted at 200 and 210 are shown in parallel data format.

The word-flipping in the data streams at 210 sufficiently breaks the checkfield sequence so that the pathological condition cannot be produced by the scrambler (Equations 1 and 2 above). The word-flipping is simple to implement, as 10-bit data is presented one way (LSB first) or another (MSB first) to the scrambler, requiring little additional hardware and adding no delay to the system. The control process for word-flipping can be fixed (for example, as at 210), or can be programmable such that any sequence of word-flipping can be employed.

This systems and methods described herein are useful for a variety of serial video data interfaces, both existing and proposed. Some proposed high-speed serial video data interfaces make use of multiple lower-speed serial video data interfaces that are run in parallel. Thus, for example, an 11.88 Gb/s serial video data interface may consist of four 2.97 Gb/s streams, such as those defined in the 3G-SDI standard. The systems and methods described herein also may be employed for the carriage of other video data formats at 11.88 Gb/s, or any other data rates used, present or future. In the case of 11.88 Gb/s serial video data interfaces, the systems and methods could be incorporated into chipsets that generated one or more 11.88 Gb/s serial video data streams from intermediate, lower-rate video data interfaces. Products such as serializers and deserializers, data combiners and de-combiners would incorporate these systems and methods.

Figure 3A:
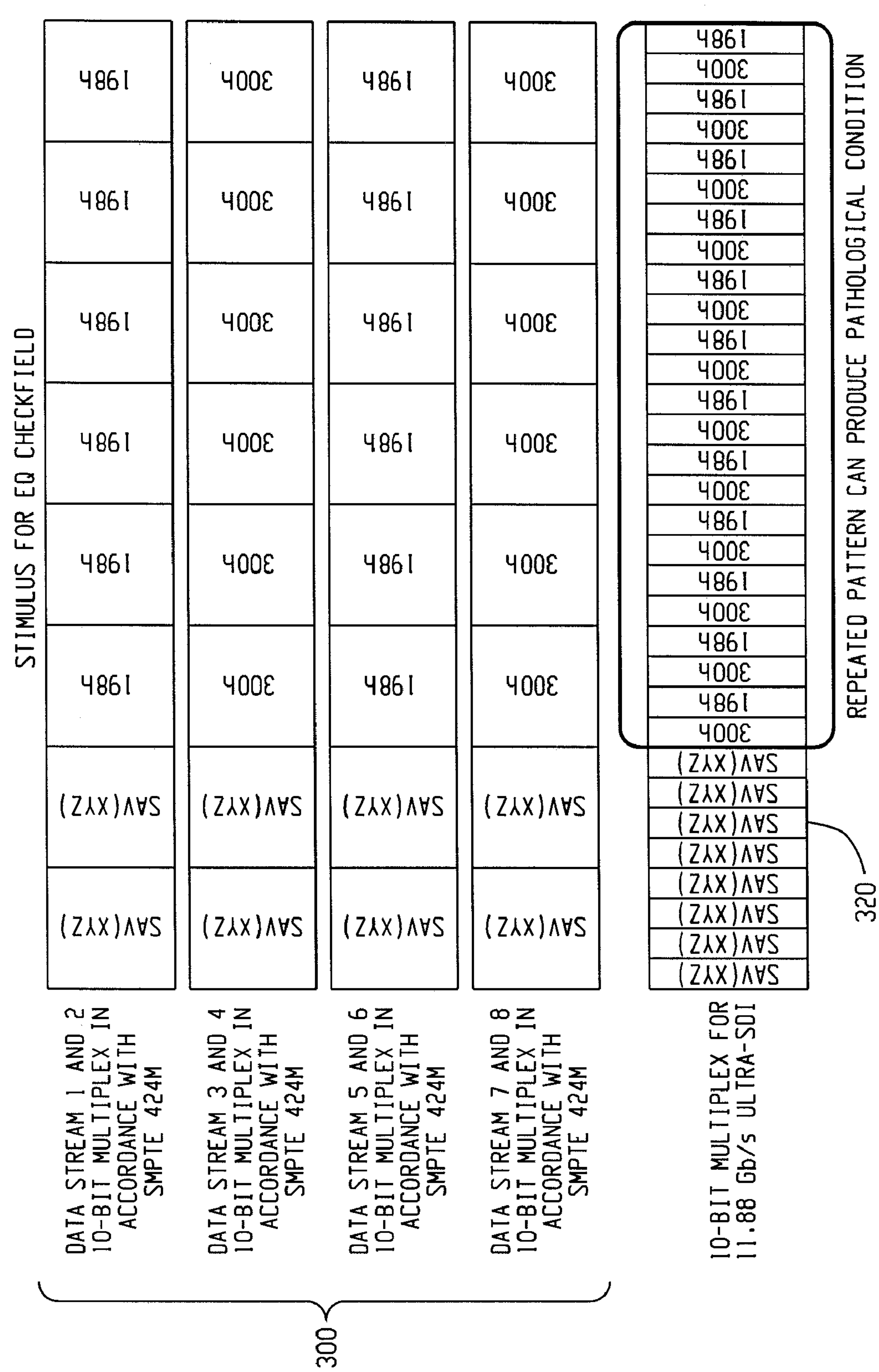
FIGS. 3A and 3B are block diagrams depicting multiplexed high-speed serial video data streams that include a pathological condition.
Figure 3B:
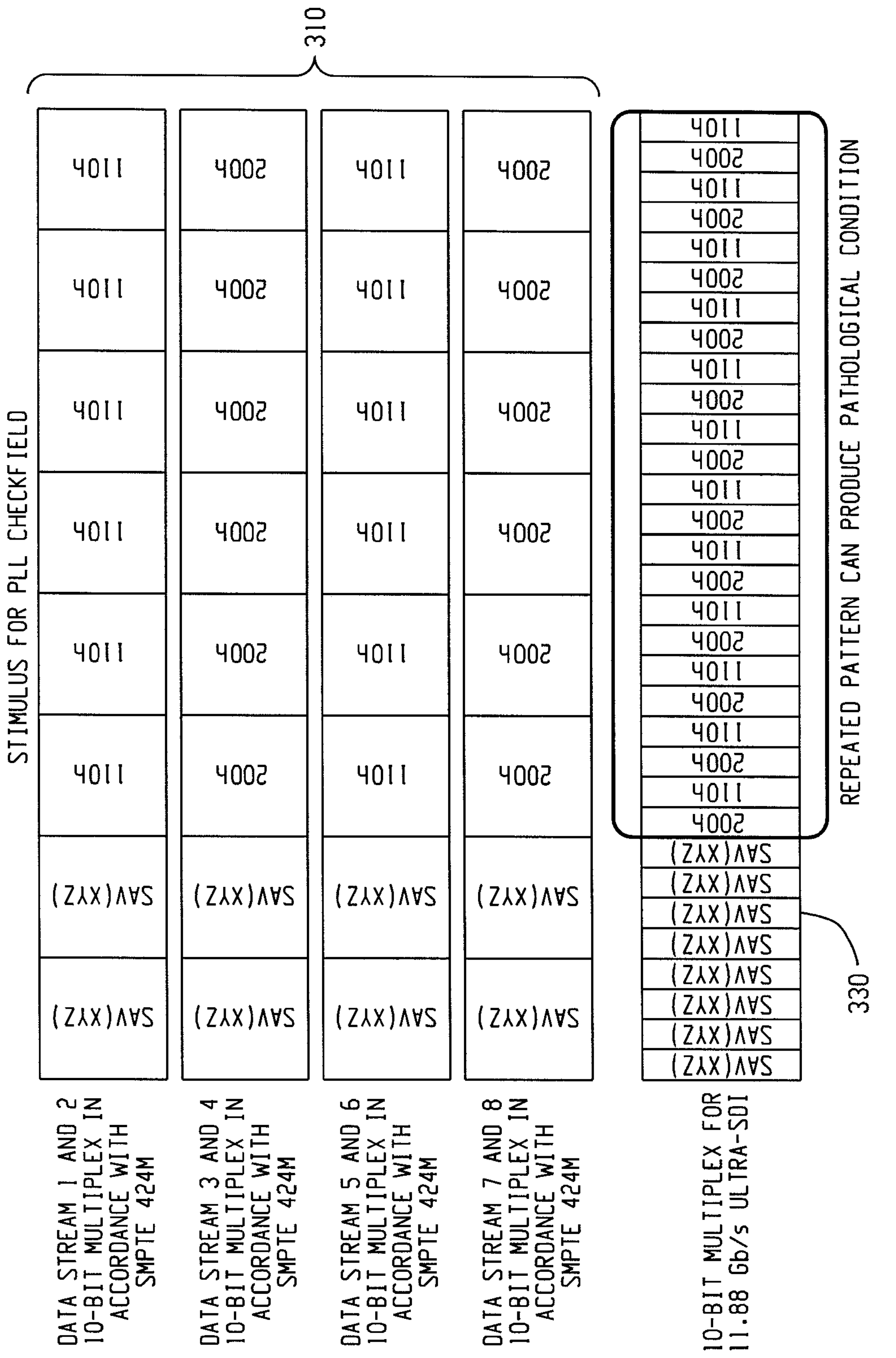

FIGS. 3A and 3B depict example data patterns within a serial video data interface in which a 11.88 Gb/s data stream is realized by concatenating four 2.97 Gb/s (3G-SDI) streams. In FIGS. 3A and 3B, each 10-bit parallel data stream is "seeded" such that when multiplexed into the 11.88 Gb/s data stream, the pathological checkfields are produced (EQ and PLL). When the 11.88 Gb/s 10-bit multiplex is serialized using the scrambler, the possibility exists that a pathological condition could be produced. Note that, in FIGS. 3A and 3B, all data streams are shown in their parallel data format at 1/10th the serial data rate.

In the data patterns depicted in FIGS. 3A and 3B, EQ signal data streams 300 and PLL signal data streams 310 are to be multiplexed. The signal patterns in the individual data streams shown at 300 and 310 are examples of signal patterns that, when multiplexed, are known to produce pathological conditions. As shown at 320, the multiplexed EQ data stream presents such a pattern. Similarly, the multiplexed PLL data stream 330 contains a data stream known to produce a pathological condition. As described above, numerous problems may result if such a pathological condition is present on a serial video data interface.

Figure 4A:
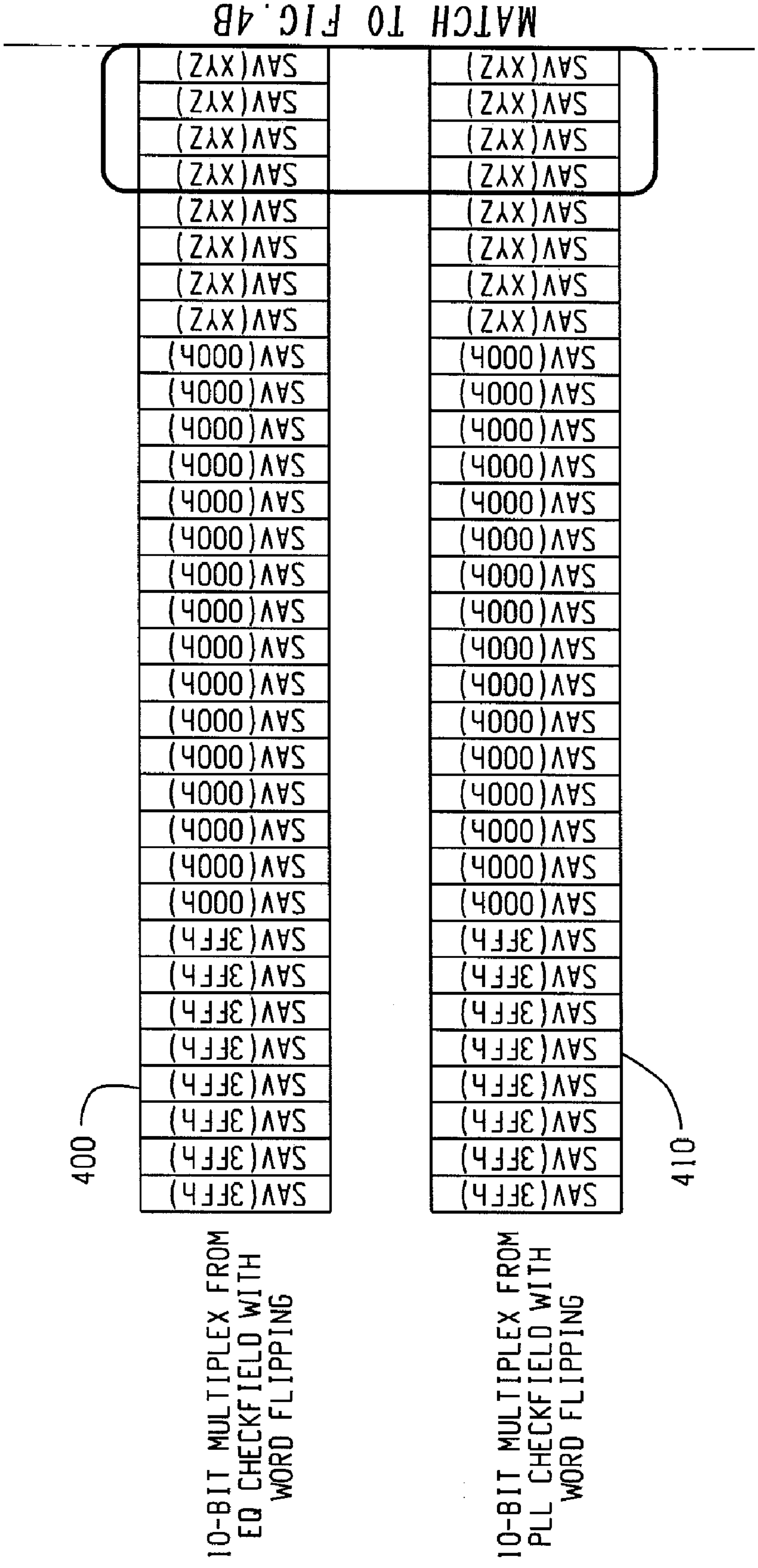
FIGS. 4A and 4B are block diagrams depicting a multiplexed high-speed serial video data stream in which data word flipping is employed to prevent a pathological condition.
Figure 4B:
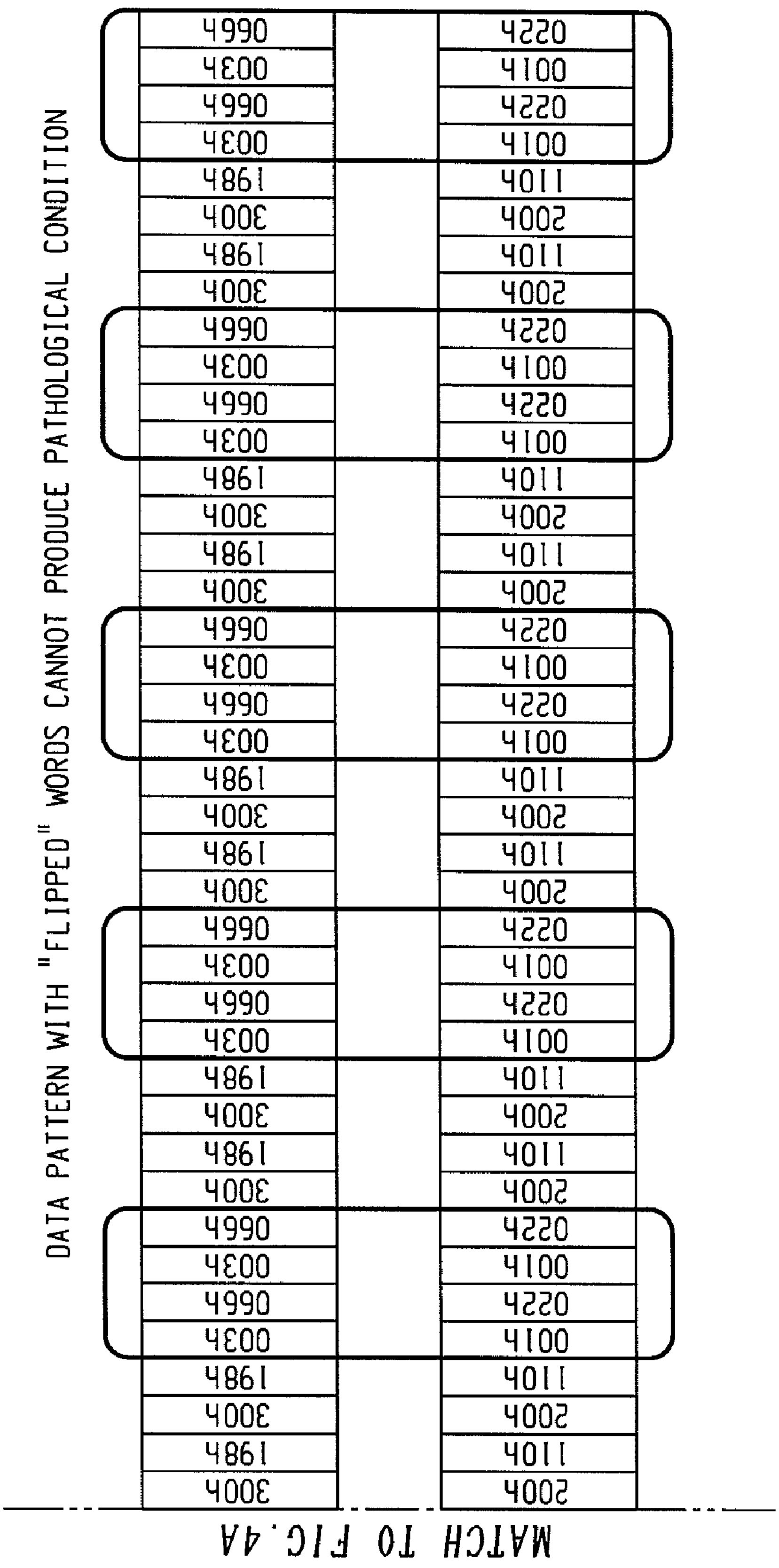

By employing the word-flipping scheme described herein and depicted above at FIG. 2, the pathological conditions shown in the 11.88 Gb/s multiplex streams 320 and 330 may be avoided. FIGS. 4A and 4B depict multiplexed data streams 400 and 410 in which data word flipping has been employed to prevent the streams from containing pathological conditions. The data streams 400 and 410 illustrate how the Timing Reference Signals (in this example, the SAV) words, 3FFh and 000h, are unaffected by the word-flipping process. Also, since the XYZ word containing critical timing information is repeated eight times, the non-flipped versions can still be decoded by receive devices such that word alignment and synchronization is still possible. The word-flipping scheme can also be employed to other scrambled video data systems which are prone to pathological conditions, regardless of polynomial size and data depth (for example, 8-bit systems).

Figure 5:
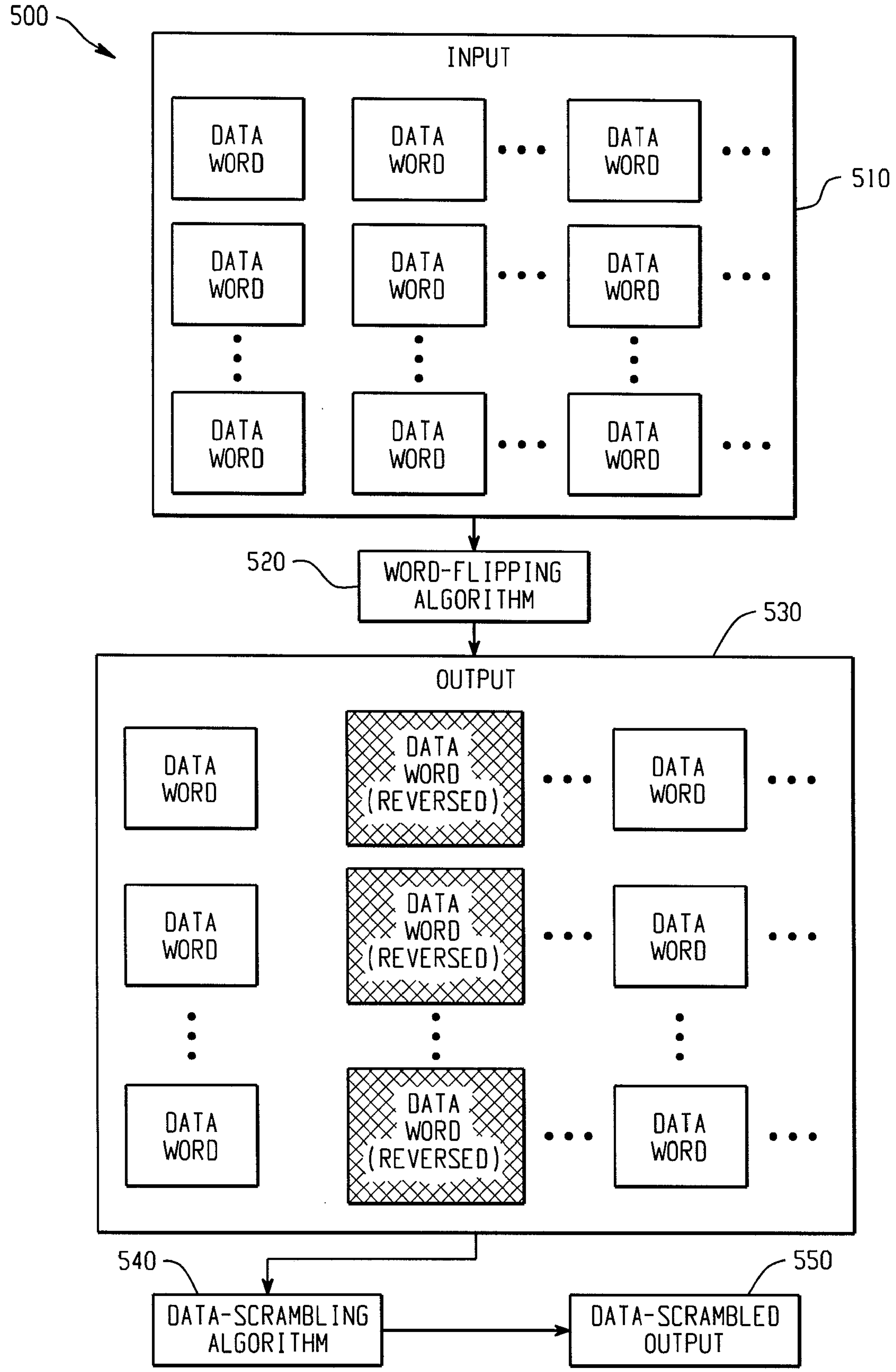
FIG. 5 is a flow diagram depicting an example method for reducing pathological conditions in a serial video interface.

FIG. 5 depicts at 500 an example method for reducing pathological conditions in a serial video interface. The example input signal 510 comprises a sequence of parallel data words that are to be transformed by a data-scrambling algorithm, such as the algorithms described above used in systems conforming to SMPTE 259M, 292M and 424M. The signal 510 is input to the word-flipping algorithm 520. The word-flipping performed by algorithm 520 upon signal 510 comprises reversing the order of the bits of one or more of the data words in the sequence of parallel data words in signal 510. Algorithm 520 may perform the word-flipping in numerous different ways. For example, algorithm 520 may include a pre-defined pattern of words to be flipped. Further, the words comprising input signal 510 may consist of a fixed or variable number of bits. A number of known serial video interfaces use a ten-bit fixed length for data words. Input signal 510 further may include data words that are not part of the video data, but instead comprise timing reference signals. The algorithm 520 may be designed such that words that are not video data, including timing reference signals, are ignored. Algorithm 520 produces output signal 530, which comprises a sequence of parallel data words including the one or more words whose bit order was reversed by algorithm 520. Data-scrambling algorithm 540 accepts as input the signal 530. Signal 530 is converted as prescribed by algorithm 540, which generates data-scrambled output signal 550. The data-scrambled output signal 550 has a reduced likelihood of including a pathological condition.

Figure 6:
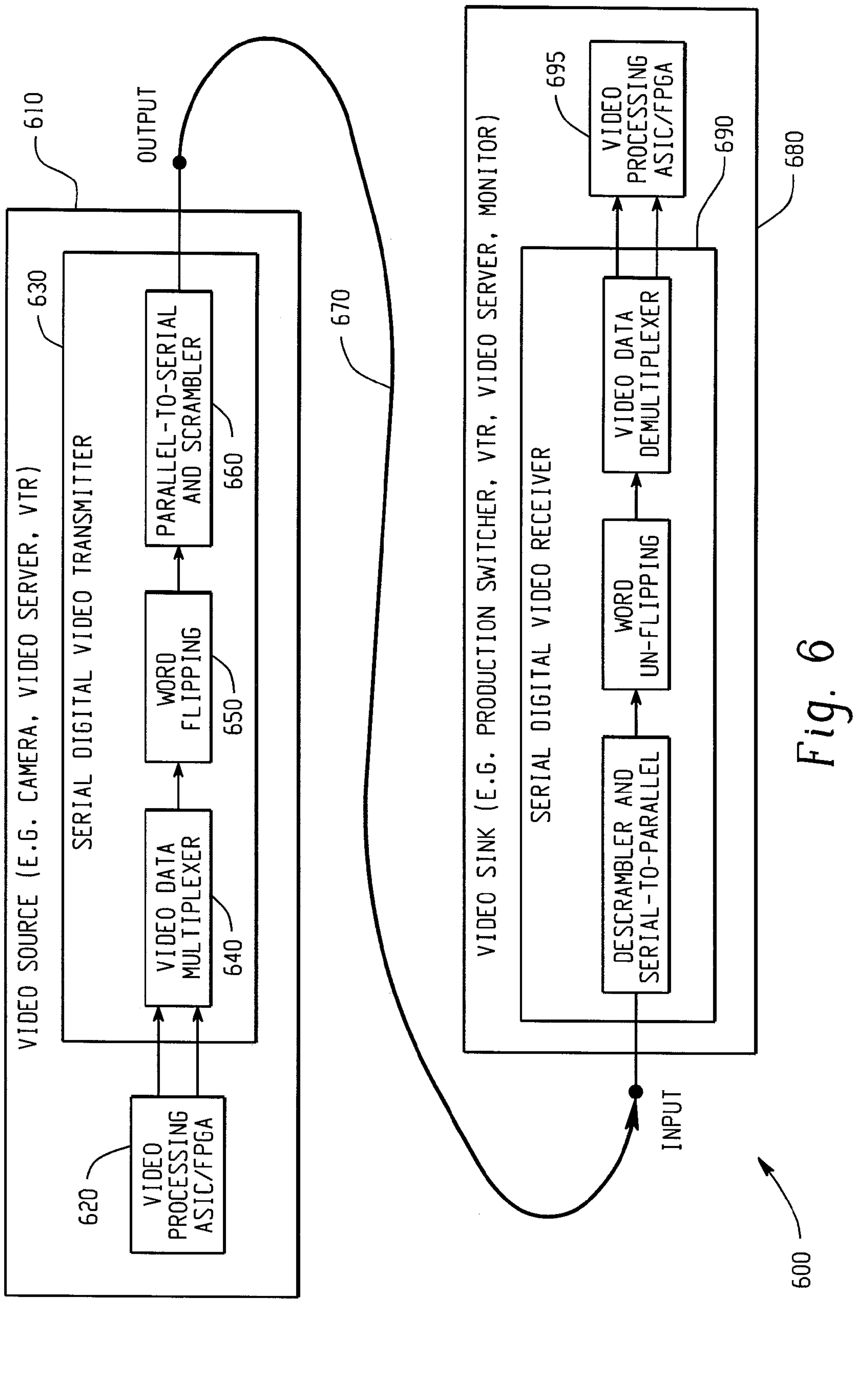
FIG. 6 is a block diagram depicting the flow of a high-speed serial video data stream in which data word flipping is employed to prevent a pathological condition.

FIG. 6 depicts at 600 an example video system, beginning with a video source 610. The example video source 610, which may for example be a video camera, video server, or video tape recorder, includes a video processor 620, which could be implemented as an application-specific integrated circuit (ASIC), a field-programmable gate array (FPGA), or any other logic device. The video processor 620 outputs a video signal into a serial digital video transmitter 630. The serial digital video transmitter 630 may be implemented as a logic device, such as, for example, an ASIC, an FPGA, or a digital signal processor (DSP). The serial digital video transmitter 630 includes a video data multiplexer 640, which can combine multiple video data streams into a single higher-bandwidth video data stream. The output of the video data multiplexer 640 comprises the input to a word flipping module 650 of the serial digital video transmitter, which applies the word-flipping technique to the video data stream in order to prevent the stream from containing a pathological condition. The video data stream then is input to a processor 660 that converts parallel signals to a serial signal and also applies the data scrambling algorithms described above.

Once the processor 660 has processed the signal, the serial digital video transmitter 630 places the signal on a video output, where the signal is coupled through a transmission medium 670 to a video input of a video sink 680. The transmission medium 670 could include an electrical or optical cable that would transmit the serial video data signal, but any medium for transmitting a signal at the appropriate bit rate could be used, including a wireless transmission medium.

The video sink 680 could include a production switcher, a video tape recorder, a video server, or display means, such as a monitor. The video sink 680 includes a serial digital video receiver 690, which reverses the processing undertaken by the video source 610 and outputs the demultiplexed video data stream(s) to a video processor 695 of video sink 680.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method for reducing pathological conditions in a serial video interface, comprising:

receiving an input including a first sequence of parallel data words that are to be transformed by a data-scrambling algorithm;

reversing the order of bits comprising one or more data words in the first sequence of parallel data words;

transmitting a second sequence of parallel data words comprising parallel data words from the first sequence that were flipped and parallel data words from the first sequence that were not flipped;

wherein a signal resulting from application of the data-scrambling algorithm to the second sequence of parallel data words has a reduced likelihood of including a pathological condition.

2. The method of claim 1, wherein one or more parallel data words in the first sequence that represent timing reference signals are ignored.

3. The method of claim 1, wherein data words whose bits are to be reversed are chosen according to a predefined pattern.

4. The method of claim 1, wherein parallel data words are comprised of a fixed number of bits.

5. The method of claim 4, wherein the fixed number of bits is 10.

6. The method of claim 1, wherein the data-scrambling algorithm includes one or more fixed polynomials.

7. The method of claim 6, wherein the one or more fixed polynomials include G1(X)=X^9+X^4+1, G2(X)=X+1, and combinations thereof.

8. A serial video interface system, comprising:

a signal input operable to receive an input signal including a first sequence of parallel data words that are to be transformed by a data-scrambling algorithm;

a video data multiplexer;

a word-flipping circuit operable to reverse the order of bits comprising one or more data words in the first sequence of parallel data words, such that a second sequence of parallel data words is generated comprising parallel data words from the first sequence that were flipped and parallel data words from the first sequence that were not flipped;

a data-scrambling circuit operable to scramble the second sequence of parallel data words according to a data-scrambling algorithm and generate a serial video data signal from a data-scrambled sequence of parallel data words; and a signal output operable to transmit an output signal comprising the serial video data signal;

wherein the output signal has a reduced likelihood of including a pathological condition.

9. The system of claim 8, wherein one or more parallel data words in the first sequence that represent timing reference signals are ignored.

10. The system of claim 8, wherein data words whose bits are to be reversed are chosen according to a predefined pattern.

11. The system of claim 8, wherein parallel data words are comprised of a fixed number of bits.

12. The system of claim 11, wherein the fixed number of bits is 10.

13. The system of claim 8, wherein the data-scrambling algorithm includes one or more fixed polynomials.

14. The system of claim 13, wherein the one or more fixed polynomials include G1(X)=X^9+X^4+1, G2(X)=X+1, and combinations thereof.

15. The system of claim 8, wherein the video data multiplexer, the word-flipping circuit, and the data-scrambling circuit are implemented on a single logic device.

16. A serial video interface system, comprising:

means for multiplexing multiple digital video data streams, wherein each of the multiple digital video data streams comprises a first sequence of parallel data words that are to be transformed by a data-scrambling algorithm;

means for reversing the order of bits comprising one or more data words in the first sequence of parallel data words in said each of the multiple digital video data streams;

means for transmitting a second sequence of parallel data words comprising parallel data words from the first sequence that were flipped and parallel data words from the first sequence that were not flipped; and means for applying the data-scrambling algorithm to the second sequence of parallel data words in said each of the multiple digital video data streams;

wherein a signal output by the data-scrambling algorithm application means has a reduced likelihood of including a pathological condition.

* * * * *